US009193373B2

(12) United States Patent
Fjelland et al.

(10) Patent No.: US 9,193,373 B2
(45) Date of Patent: Nov. 24, 2015

(54) FOLDABLE STROLLER

(71) Applicant: Stokke AS, Alesund (NO)

(72) Inventors: Alf Vegard Fjelland, Alesund (NO); Josef Efraim Tangen, Gamle Fredrikstand (NO)

( * ) Notice: Subject to any disclaimer, the term of this patent is extended or adjusted under 35 U.S.C. 154(b) by 0 days.

(21) Appl. No.: 14/429,135

(22) PCT Filed: Sep. 19, 2013

(86) PCT No.: PCT/EP2013/069431
§ 371 (c)(1),
(2) Date: Mar. 18, 2015

(87) PCT Pub. No.: WO2014/044737
PCT Pub. Date: Mar. 27, 2014

(65) Prior Publication Data
US 2015/0217793 A1    Aug. 6, 2015

(30) Foreign Application Priority Data

Sep. 19, 2012  (NO) .................................. 20121066

(51) Int. Cl.
*B62B 7/06*    (2006.01)
*B62B 7/10*    (2006.01)

(52) U.S. Cl.
CPC .................... *B62B 7/10* (2013.01)

(58) Field of Classification Search
CPC ............. B62B 7/06; B62B 7/08; B62B 7/10; B62B 7/062; B62B 7/064; B62B 2205/18; B62B 2205/20
See application file for complete search history.

(56) References Cited

U.S. PATENT DOCUMENTS

| 6,991,248 | B2 * | 1/2006 | Valdez et al. | 280/647 |
| 7,296,820 | B2 * | 11/2007 | Valdez et al. | 280/647 |
| 7,396,039 | B2 * | 7/2008 | Valdez et al. | 280/644 |
| 7,632,035 | B2 * | 12/2009 | Cheng | 403/98 |

(Continued)

FOREIGN PATENT DOCUMENTS

| FR | 2 567 472 | 1/1986 |
| GB | 2 476 391 | 6/2011 |

OTHER PUBLICATIONS

International Search Report, PCT/EP2013,069431, dated Dec. 17, 2013.

*Primary Examiner* — Hau Phan
*Assistant Examiner* — Jacob Meyer
(74) *Attorney, Agent, or Firm* — Finnegan, Henderson, Farabow, Garrett & Dunner LLP

(57) ABSTRACT

A stroller includes a first wheel assembly, a second wheel assembly, and a handle bar assembly, with each respective assembly being configured to connect to respective first, second, and third rotatable elements of a folding mechanism. Each of the first, second, and third rotatable elements are rotatably supported by a common axle. The stroller further includes a leverage element rotatably supported by a leverage axle, with the leverage axle being supported by the third rotatable element and being arranged in a parallel relationship with the common axle. The leverage element includes an axle slot for accommodating movement of the common axle. The leverage element also includes a first pin and a second pin, with the first pin being rotatably supported by the first rotatable element in a receptacle arranged at a first distance from the common axle, and the second pin being rotatably supported by the second rotatable element in a second receptacle at a second distance from the common axle.

14 Claims, 12 Drawing Sheets

(56) References Cited

U.S. PATENT DOCUMENTS

| | | | |
|---|---|---|---|
| 7,798,500 B2* | 9/2010 | Den Boer | 280/47.34 |
| 7,798,515 B2* | 9/2010 | Valdez et al. | 280/647 |
| 8,205,907 B2* | 6/2012 | Chicca | 280/642 |
| 8,226,110 B2* | 7/2012 | Liao | 280/642 |
| 8,226,111 B2* | 7/2012 | Valdez et al. | 280/647 |
| 8,308,391 B2* | 11/2012 | Cheng | 403/98 |
| 8,550,489 B2* | 10/2013 | Valdez et al. | 280/647 |
| 8,596,669 B2* | 12/2013 | Liao | 280/642 |
| 8,602,442 B2* | 12/2013 | Li | 280/647 |
| 8,714,581 B2* | 5/2014 | Fritz et al. | 280/642 |
| 8,870,213 B1* | 10/2014 | Xu | 280/642 |
| 8,870,214 B2* | 10/2014 | Kane et al. | 280/647 |
| 8,876,147 B2* | 11/2014 | Chicca | 280/642 |
| 8,899,613 B2* | 12/2014 | Cheng | 280/642 |
| 8,985,616 B1* | 3/2015 | Chen | 280/642 |
| 9,050,993 B2* | 6/2015 | Pollack | |
| 2003/0085551 A1* | 5/2003 | Allen et al. | 280/642 |
| 2004/0222616 A1* | 11/2004 | Valdez et al. | 280/647 |
| 2006/0038382 A1* | 2/2006 | Valdez et al. | 280/647 |
| 2006/0071451 A1* | 4/2006 | Cheng | 280/642 |
| 2007/0096438 A1* | 5/2007 | Valdez et al. | 280/652 |
| 2008/0088116 A1* | 4/2008 | Den Boer | 280/650 |
| 2008/0143081 A1* | 6/2008 | Valdez et al. | 280/642 |
| 2010/0025968 A1* | 2/2010 | Fritz et al. | 280/647 |
| 2010/0045002 A1* | 2/2010 | Cheng | 280/650 |
| 2010/0308562 A1* | 12/2010 | Valdez et al. | 280/642 |
| 2011/0084467 A1* | 4/2011 | Liao | 280/642 |
| 2011/0181024 A1* | 7/2011 | Chicca | 280/642 |
| 2011/0248477 A1* | 10/2011 | Chen et al. | 280/647 |
| 2012/0126512 A1* | 5/2012 | Kane et al. | 280/647 |
| 2012/0256397 A1* | 10/2012 | Valdez et al. | 280/642 |
| 2012/0261906 A1* | 10/2012 | Chicca | 280/642 |
| 2013/0025387 A1* | 1/2013 | Cheng | 74/89.18 |
| 2013/0113185 A1* | 5/2013 | Zehfuss | 280/647 |
| 2013/0113188 A1* | 5/2013 | Liao | 280/650 |
| 2013/0140797 A1* | 6/2013 | Fritz et al. | 280/649 |
| 2014/0217706 A1* | 8/2014 | Chicca | 280/650 |
| 2014/0339793 A1* | 11/2014 | Xu | 280/650 |
| 2015/0063898 A1* | 3/2015 | Cheng | 403/98 |

* cited by examiner

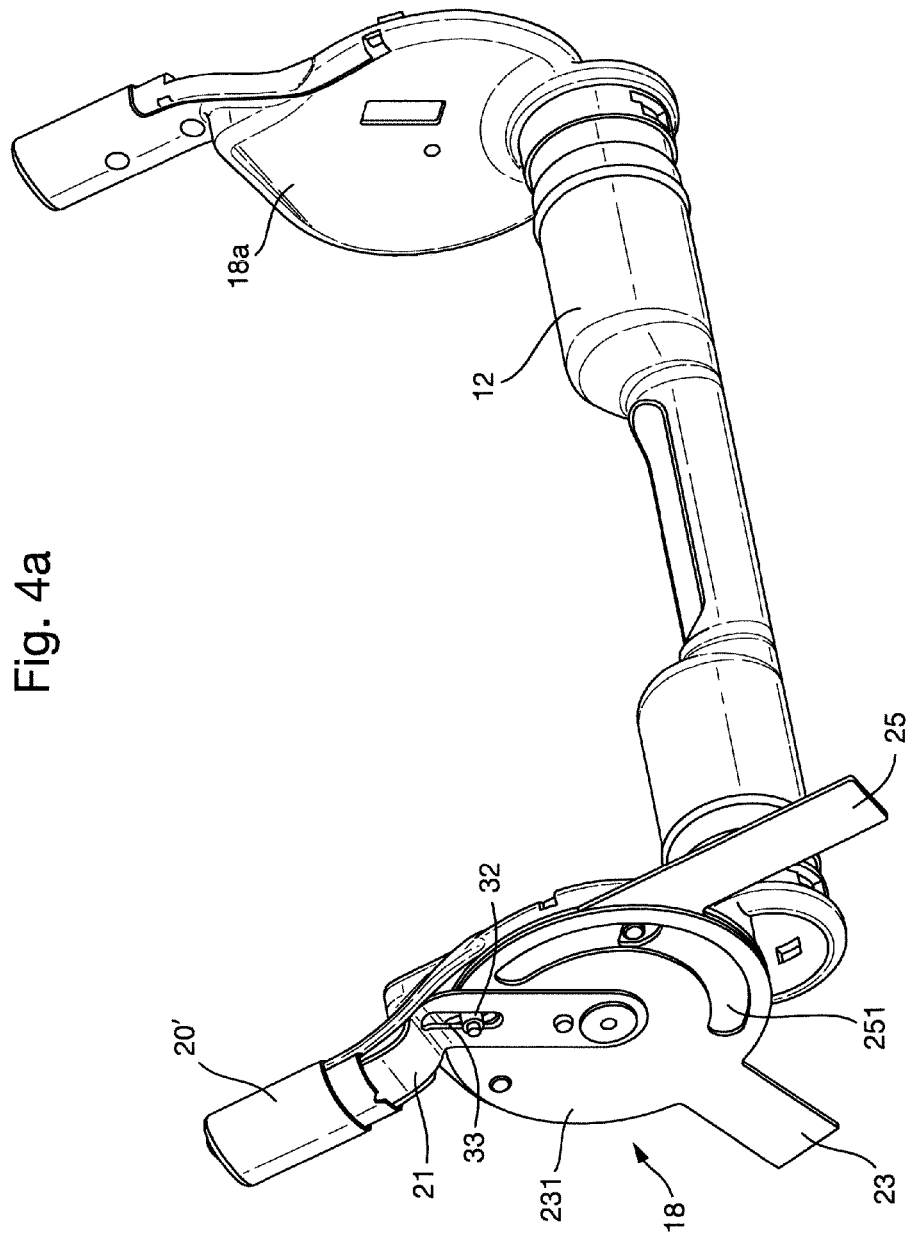

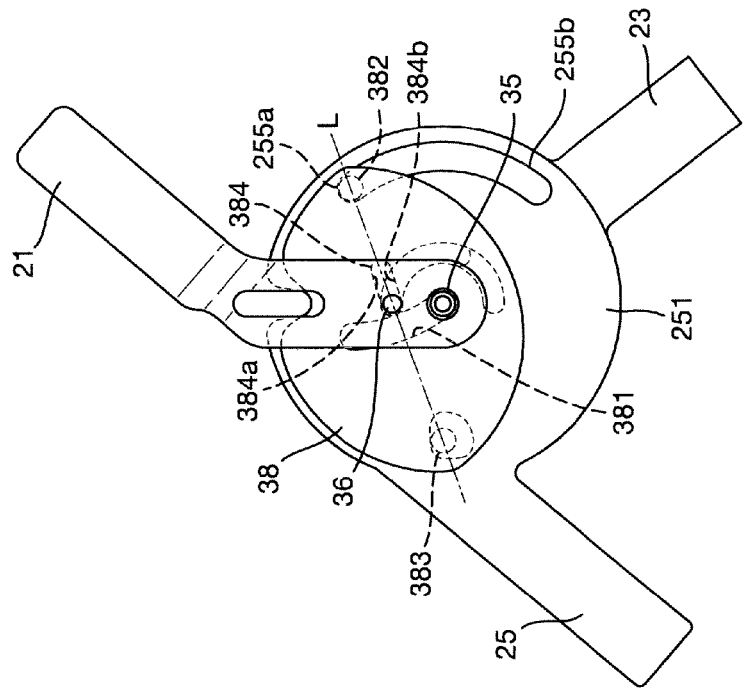
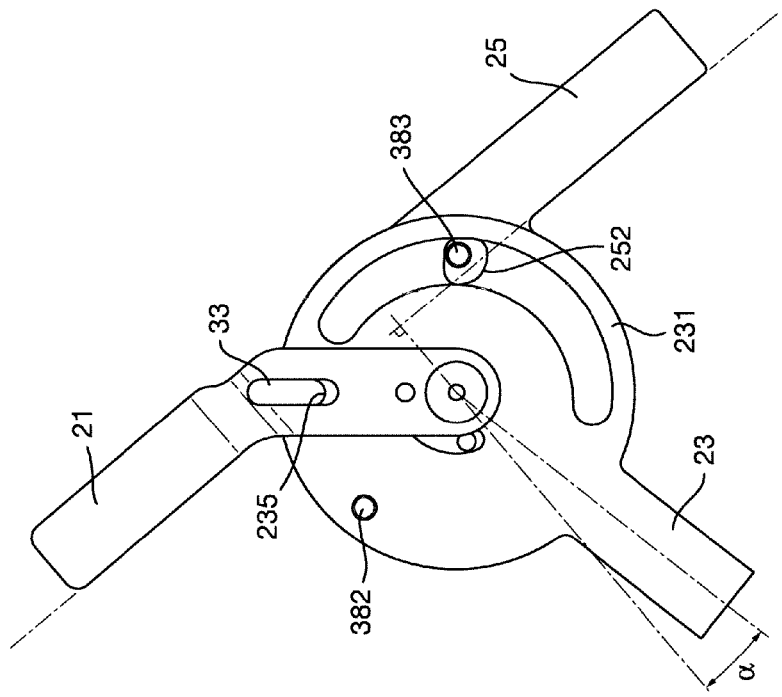

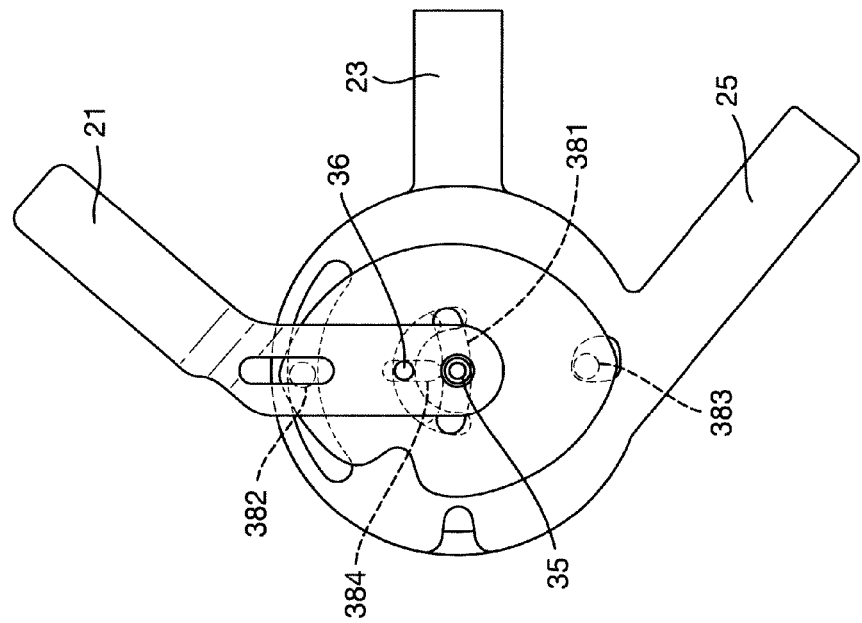
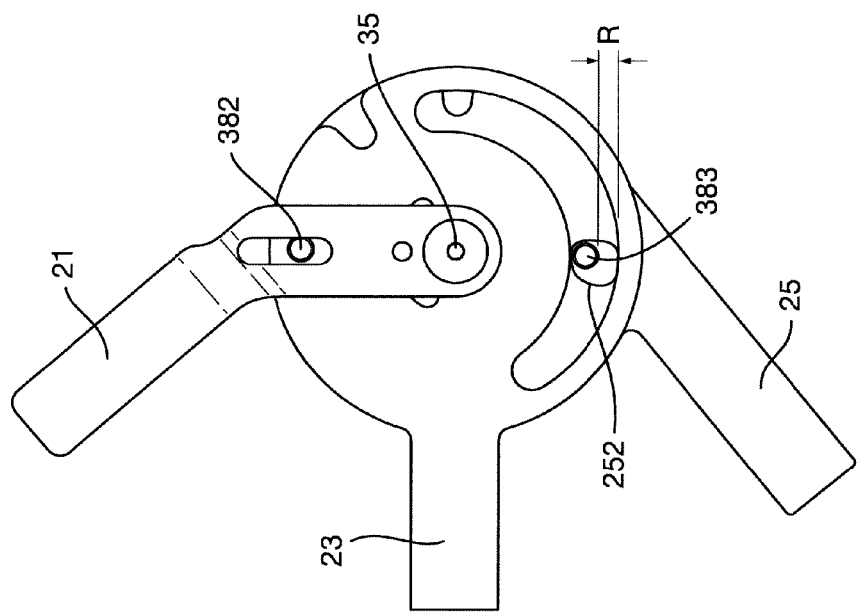

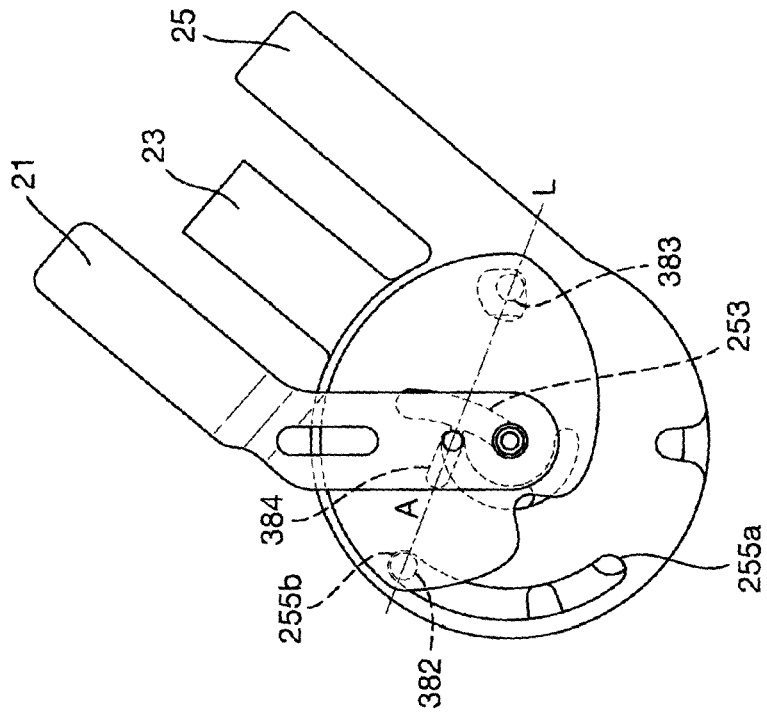
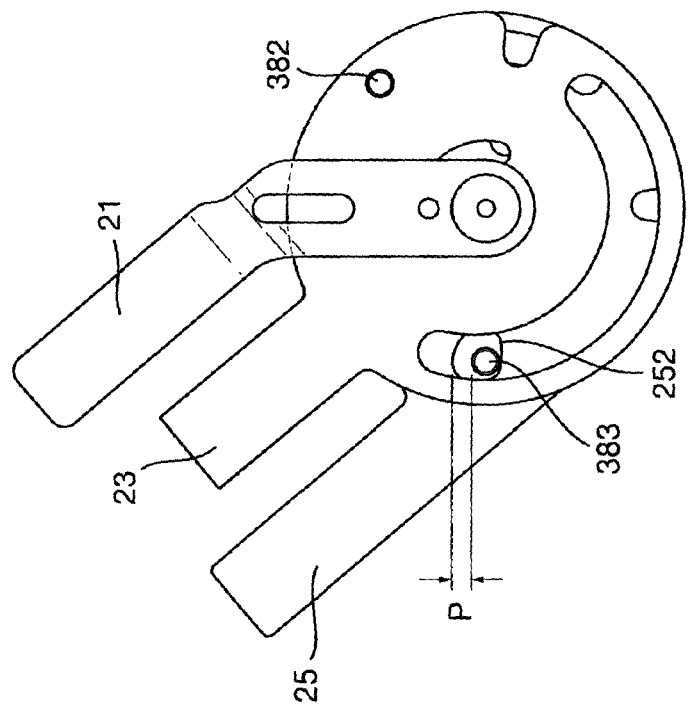

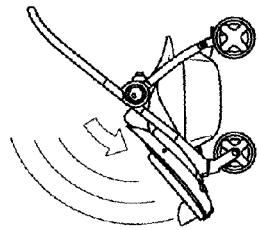
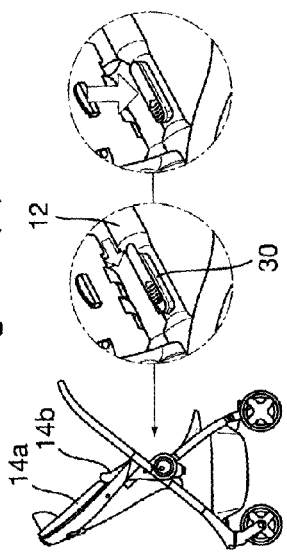
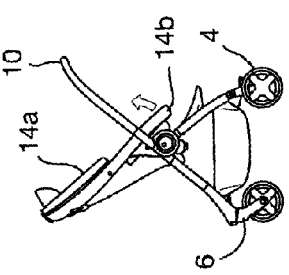
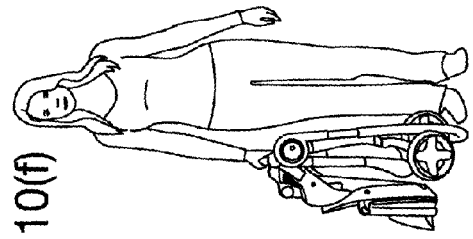
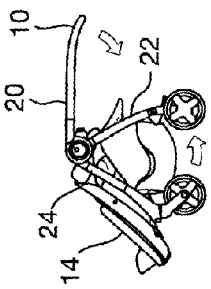
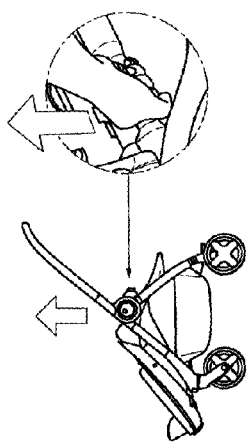

FOLDABLE STROLLER

CROSS REFERENCE TO RELATED APPLICATIONS

This application is a national phase application based on PCT/EP2013/069431, filed Sep. 19, 2013, which claims the priority of Norwegian Patent Application No. 20121066, filed Sep. 19, 2012, the content of each application being incorporated by reference herein.

FIELD OF THE INVENTION

The invention relates to baby strollers, and more particularly to baby strollers that can be folded. More specifically, the invention relates to a stroller having a folding mechanism, as specified in the preamble of claim 1.

BACKGROUND OF THE INVENTION

Strollers, also referred to as push-chairs or prams, are commonly used to transport infants or toddlers. Foldable strollers offer the advantage of being easy to stow when not in use.

The state of the art includes U.S. Pat. No. 7,396,039 B2 (Valdez, et al.), describing an all-terrain baby stroller having a folding mechanism. The stroller comprises a foldable, tubular metal frame with a transversely extending rear axle assembly and a front wheel. The tubular frame includes left and right folding assemblies. Each of the folding assemblies includes two rotatable members, each having a disk with a notch and an arm; one arm being connected to the stroller handle and the arm being connected to the front wheel frame. The rotatable members, along with a corresponding rear wheel supports, are contained between housing halves that allow the arms to protrude outside of the housing. The inside wall of each half of the housing has a recess sized and shaped such that when the two halves of the housing are positioned together, the recesses form a cavity to securely receive the upper free-end portion of the rear wheel support. The disks are rotatable about a common bushing and may be interlocked by means of a spring-loaded tip mounted on the rear wheel support. The stroller may be folded by retracting the tip from the notches and rotating the disks with respect to one another, such that the front wheel support and the handle support are moved into close proximity to the rear wheel support.

The state of the art also includes U.S. Pat. No. 7,632,035 B2 (Cheng) which discloses a baby stroller having a folding mechanism. The folding mechanism includes a folding assembly having a first and second rotatable members rotatably mounted on an axle to rotate relative to each other. The first rotatable member is positioned for rotation in a first rotation plane and the second rotatable member is positioned for rotation in a second rotation plane, the first and second rotation planes are spaced apart. The first rotatable member has a first gear and the second rotatable member has a second gear. The folding assembly further has a third gear and a fourth gear configured to rotate together as a unit. The third gear is positioned in driving engagement with the first gear and the fourth gear is positioned in driving engagement with the second gear so that the first rotatable member and the second rotatable member rotate relative to each other in geared coordination.

The state of the art also includes U.S. Pat. No. 8,205,907 B2 (Chicca), describing a collapsible stroller having a frame with two so-called cam-fold units. Each cam-fold unit includes an inverse cam comprising a follower and a motion-transfer pin. Each of cam-fold units is coupled to the pusher handle and to the front wheel assembly and the rear wheel assembly. Each cam-fold unit includes a cam-support base, an inverse cam including a follower and a motion-transfer pin, and a pin mover. The cam-support base is coupled to the rear wheel assembly. The follower is coupled to the front wheel assembly so that the front and rear wheel assemblies move relative to one another when the follower is moved, by movement of the motion-transfer pin and pin mover. The pin mover is coupled to the pusher handle so that the pin mover moves relative to the rear wheel assembly to cause relative movement of the motion-transfer pin, follower, and front wheel assembly relative to the rear wheel assembly when the pusher handle is moved by a user relative to the rear wheel assembly.

The applicant has devised and embodied this invention to overcome certain shortcomings with the prior art and to obtain further advantages.

SUMMARY OF THE INVENTION

The invention is set forth and characterized in the main claim, while the dependent claims describe other characteristics of the invention.

It is thus provided a stroller, comprising a first wheel assembly, a second wheel assembly, and a handle bar assembly; each one of these assemblies being configured for connection to respective ones of individual first, second and third rotatable elements of a folding mechanism; the rotatable elements being rotatably supported by a common axle; characterized by a leverage element rotatably supported by a leverage axle which is supported by the third rotatable element and arranged in a parallel relationship with the common axle; the leverage element further comprising an axle slot for accommodating movement the common axle; the leverage element further comprising two pins where the first pin is rotatably supported by the first rotatable element in a receptacle arranged at a first distance from the common axle, and the second pin being rotatably supported by the second rotatable element in a second receptacle at a second distance from the common axle.

In one embodiment, the axles are spaced apart by an axle distance. The rotatable elements are in one embodiment arranged in a side-by-side relationship.

The first rotatable element comprises in one embodiment a first arcuate slot and the second rotatable element comprises a second arcuate slot, both slots being configured for accommodating arcuate movement of the leverage axle with respect to the first and second rotatable elements. The leverage element is rotatably supported by the leverage axle via a leverage slot having sides for transferring forces between the leverage axle and the leverage element.

In one embodiment, the second rotatable element comprises a second arcuate cut-out, configured and dimensioned so as to allow movement of the first pin; said cut-out having end stops defining the extent of permitted travel for the first pin.

In one embodiment, the third rotatable element comprises two halves, arranged on opposite sides of the juxtaposed assembly of the first and second rotatable elements and the leverage element.

The stroller comprises in one embodiment a first locking member which is operable to lock and unlock the folding mechanism against rotation about the common axle, the third rotatable element comprising a first locking member slot in which the first locking member is movable; the first and second rotatable elements comprising respective first and second locking notches, and the leverage element comprising a third locking notch; each notch being configured for locking and releasable engagement with the first locking member.

In one embodiment, the stroller comprises two folding mechanisms, one on each lateral side of the stroller, and the first locking member of each folding mechanism is supported by an actuator element slidably received in a folding mechanism housing. Release means are configured for simultaneous operation of both the respective actuator element of the two folding mechanisms. In one embodiment, a housing is configured for holding the release means and extends between the two folding mechanism housings; the housing also providing a handle bar by means of which the stroller may be lifted.

In one embodiment, the stroller comprises respective seat attachment means associated with each folding mechanism housing and rotatably supported by at least a portion of the housing; each seat attachment means comprising a receptacle for a seat and a recess configured for locking engagement with a second locking member configured for selectively locking the respective seat attachment means against rotation about the housing. The second locking member may be fixedly connected to the respective actuator element of the respective folding mechanism.

BRIEF DESCRIPTION OF THE DRAWINGS

These and other characteristics of the invention will become clear from the following description of a preferential form of embodiment, given as a non-restrictive example, with reference to the attached drawings, wherein:

FIG. 4a is a perspective view and partly cut-away view similar to that of FIG. 3, but where certain components have been removed; showing an embodiment of the invented folding mechanism;

FIGS. 7a and 7b are side views of opposite sides of the folding mechanism, in a state corresponding to an unfolded state of the stroller (FIG. 7b is a transparent view);

FIGS. 8a and 8b are side views of opposite sides of the folding mechanism, in a state corresponding to an intermediate state of folding for the stroller (FIG. 8b is a transparent view);

FIGS. 9a and 9b are side views of opposite sides of the folding mechanism, in a state corresponding to a folded state of the stroller (FIG. 9b is a transparent view); and FIG. 10a-f is an illustration of a folding sequence for the stroller, the seat being mounted in a rearward-facing configuration.

DETAILED DESCRIPTION OF A PREFERENTIAL EMBODIMENT

Figure 1:
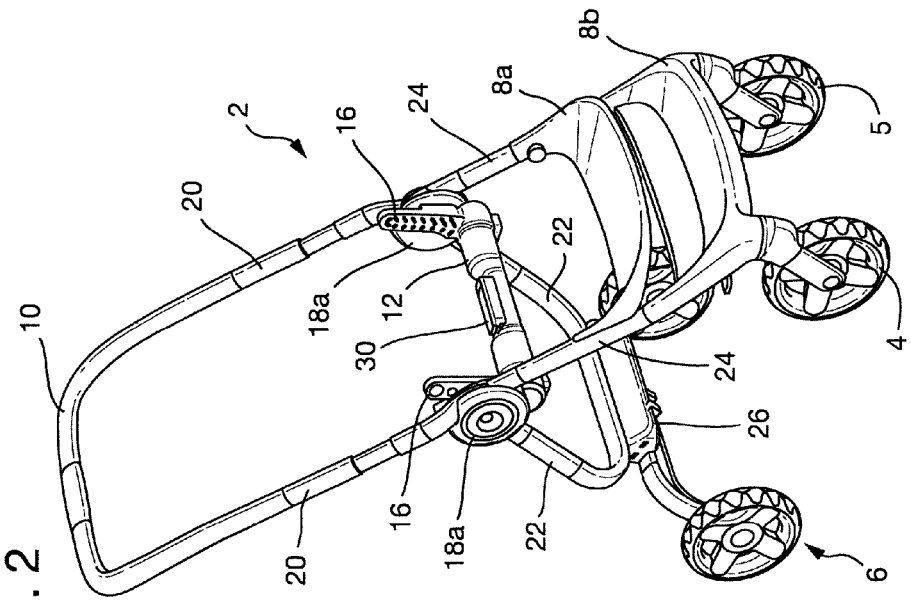
FIG. 1 is a perspective view of an embodiment of the invented stroller.
Figure 2:
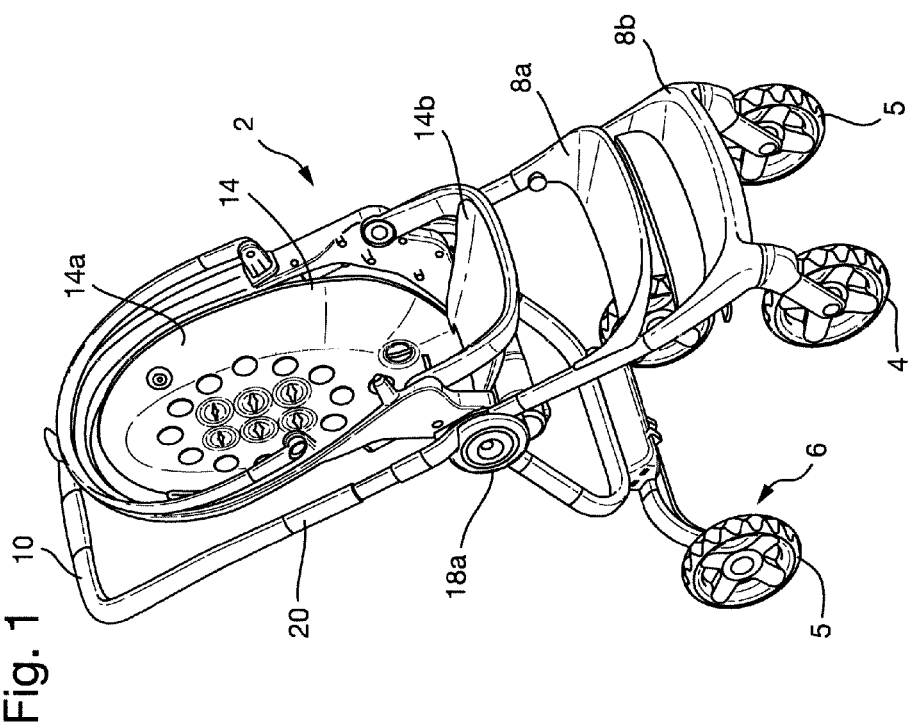
FIG. 2 is a view similar to that of FIG. 1, but where the seat has been removed.

Referring initially to FIG. 1 and FIG. 2, the invented stroller 2 comprises in the illustrated embodiment a framework structure having a front wheel assembly 4, a rear wheel assembly 6 and a handle bar assembly 10. The front and rear wheel assemblies 4, 6 comprise respective pairs of struts 24, 22, and the handle bar assembly 10—by means of which the stroller may be moved and controlled—also comprises a pair of struts 20. The struts 20, 22, 24 and the framework structure in general are conveniently made of tubular members, of suitable materials that are commonly known in the art. A first foot rest 8a is connected between the pair of front struts 24, and a second, lower, foot rest 8b is joining the pair of front struts at their lower end. FIG. 2 shows how, on opposite lateral sides of the stroller, a front strut 24, a rear strut 22 and a handle bar strut 20 are interconnected via a junction with reference number 18a. This junction, one on each side of the stroller, comprises a housing for a mechanism (described below) by means of which the stroller may be folded (as shown in FIGS. 10d-f).

Each wheel assembly 4, 6 comprises respective pairs of wheels 5; the wheels of the front assembly being pivotable about a vertical axis in order to make the stroller easy to steer. The wheels of the rear assembly may be furnished with a user-operated brake (not shown). It should be understood that the invention is not limited to this wheel configuration (which is well known in the art), but is equally suitable with e.g. other known variants such as those having the pairs of wheels connected by conventional axles and/or tri-cycle set-ups.

The stroller 2 comprises a seat 14, having a back rest 14a and a seat portion 14b. In FIG. 1 it is shown in a forward-facing orientation, but the seat may also be oriented facing towards the rear (see FIG. 10), i.e. such that the infant is facing the person pushing the stroller. The seat is detachable from the stroller.

Figure 3:
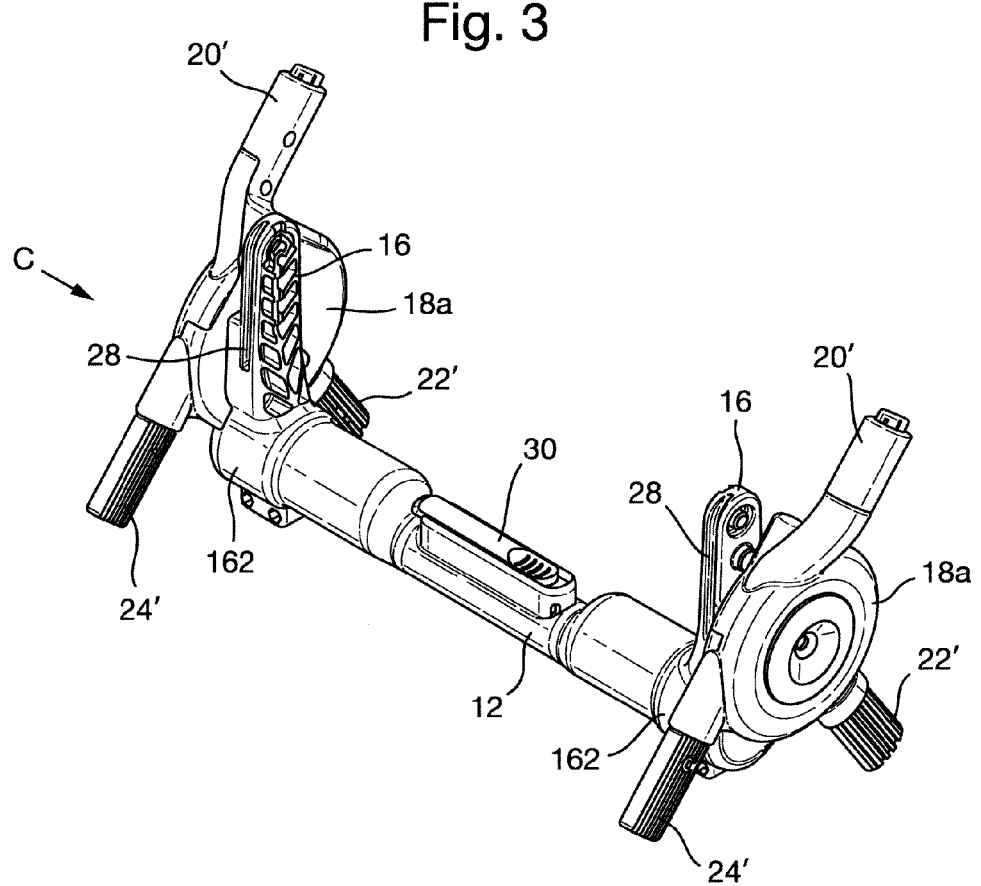
FIG. 3 is a perspective view of a portion of the stroller, illustrating the seat support section and the housings for the folding mechanisms.

Referring now to FIGS. 2 and 3, the seat is releasably connected to the stroller via a pair of brackets 16. In the illustrated embodiment, each bracket 16 has a receptacle groove 28 configured for mating engagement with corresponding lips (not shown) on opposite sides of the seat. Each seat bracket 16 is pivotally connected to the folding mechanism and its housing 18a via a bushing 162, rotatably supported by a tubular housing 12. The tubular housing 12 holds a lock-and-release mechanism (not shown) by means of which the folding mechanism and the seat brackets 16 may be controlled. This control is accomplished by the user operating the release handle 30, in a simultaneous slide-and-press operation (to prevent inadvertent release).

Figure 4B:
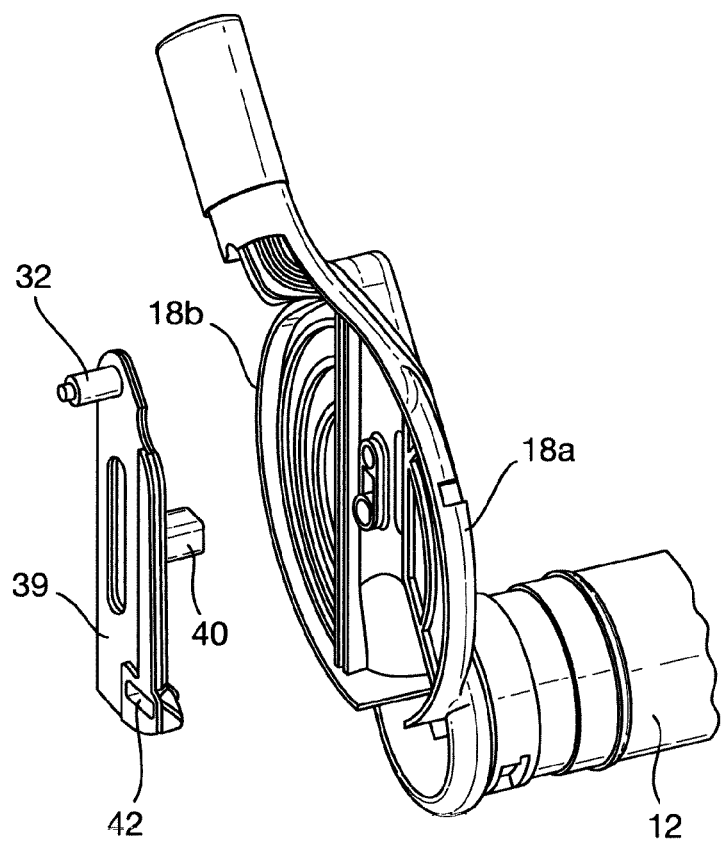
FIG. 4b shows a portion of the components illustrated in FIG. 4a, and the folding mechanism has been removed in order to disclose an actuator element.
Figure 4C:
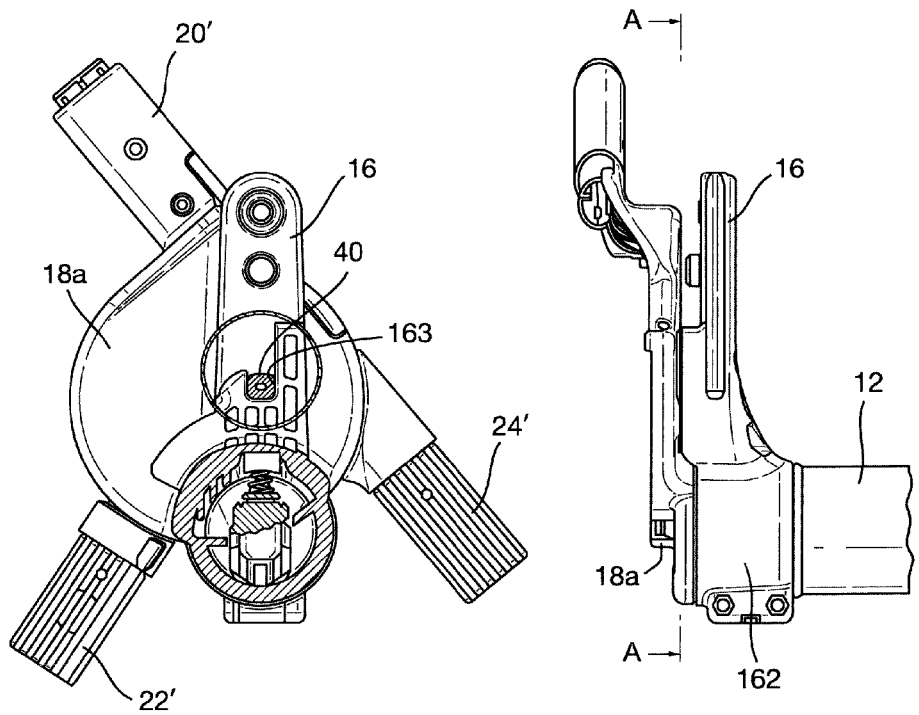
FIGS. 4c and 4d are end sectional views of a portion of the seat support section, and show a seat bracket in a locked position (FIG. 4c) and an unlocked and rotated position (FIG. 4d)
Figure 4D:
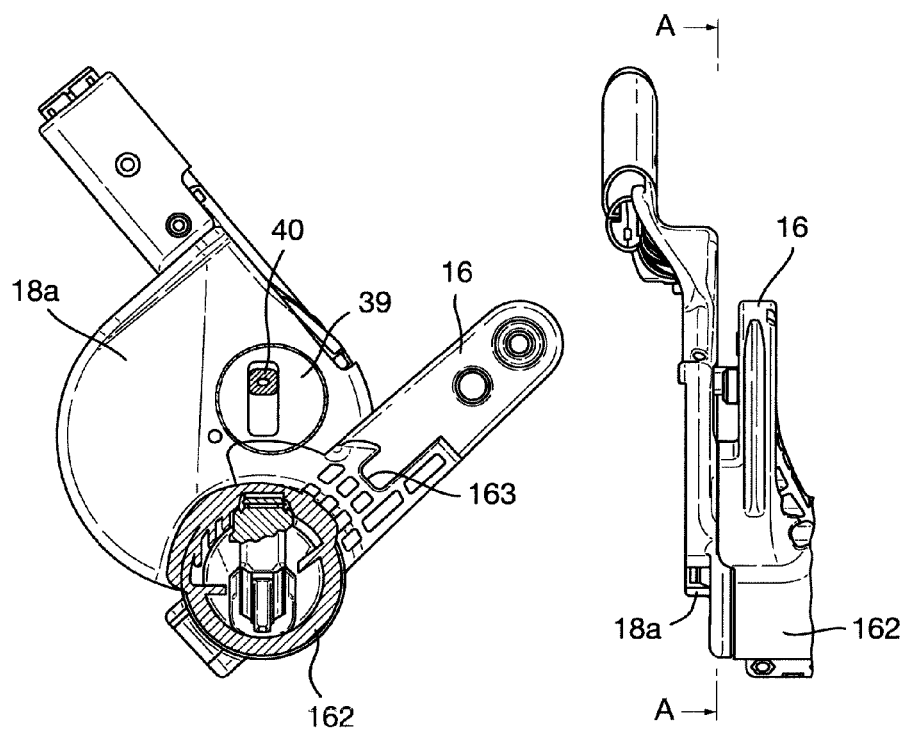

FIG. 4a shows the folding mechanism 18 in more detail. In this figure, an part of the folding mechanism housing has been removed on the stroller right-hand side (left-hand side in the figure) so as to expose the folding mechanism 18. Other components (such as the release handle, the stroller left-hand side folding mechanism, and the seat attachment brackets 16) have been omitted altogether. In FIG. 4b, which shows the stroller right-hand portion of the housings illustrated in FIG. 4a, the folding mechanism has been removed so as to disclose an actuator element 39. It will be appreciated by studying FIG. 4b, that this actuator element—when in operation—is arranged in the housing 18a, between the housing wall 18b and the folding mechanism. The actuator element 39 comprises an arrester peg 32 (also shown in FIG. 4a) for locking the folding mechanism against rotation, and a knob 40 for locking the seat bracket 16 against rotation. A groove (not shown in FIG. 4b) in the housing wall 18c allows the knob 40 to extend through the wall to where in may interact with the seat bracket 16. The actuator element 39 also comprises a socket 42 into which a portion of the above mentioned lock-and-release mechanism (not shown) extends. The actuator element 39 is thus movable (up and down) when the user operates the release handle 30. This is indicated in FIGS. 4c and 4d, illustrating how the actuator element 39 locks the bracket 16 against rotation when the knob is engaged in a recess 163 on the bracket (FIG. 4c) and how the bracket 16 is rotatable when the actuator element (and hence the knob 40) has been lifted out of the recess 163 (FIG. 4d).

Referring again to FIG. 4a, the following description will refer to the stroller right-hand side folding mechanism. It should be understood that this description also applies is to the stroller's left-hand side folding mechanism (not shown in FIG. 4a), and that the components of this latter folding mechanism are arranged laterally reversed compared to the components of the right-hand folding mechanism.

Figure 5:
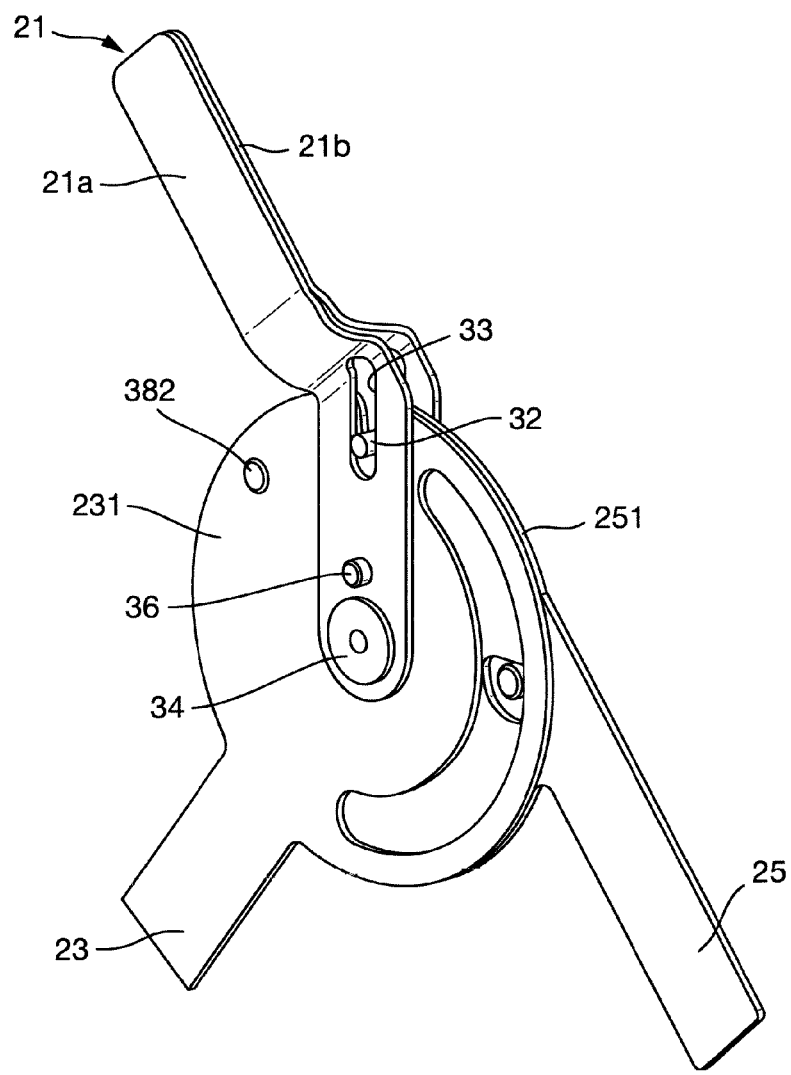
FIG. 5 is a perspective view of the invented folding mechanism, shown in a state corresponding to an unfolded state of the stroller.

Referring now to additionally to FIG. 5, the invented folding mechanism comprises a first disk 231 having a first arm 23, and a second disk 251 having a second arm 25. The first arm 23 is configured for connection to one of the rear struts 22 via a connection piece 22' and the second arm 25 is configured for connection to one of the front struts 24 via a connection piece 24' (see FIG. 3). The disks 231, 251 are arranged in a side-by-side relationship and rotatably supported by a common axle (not shown in FIG. 5) having an end flange 34. The disks 231, 251 may be selectively locked and released with respect to relative rotation via the above mentioned movable arrester peg 32.

A third arm 21 is configured for connection to a handle bar strut 20 (not shown in FIGS. 4 and 5) via a handle bar connection piece 20' and is also rotatably supported via the common axle.

Figure 6:
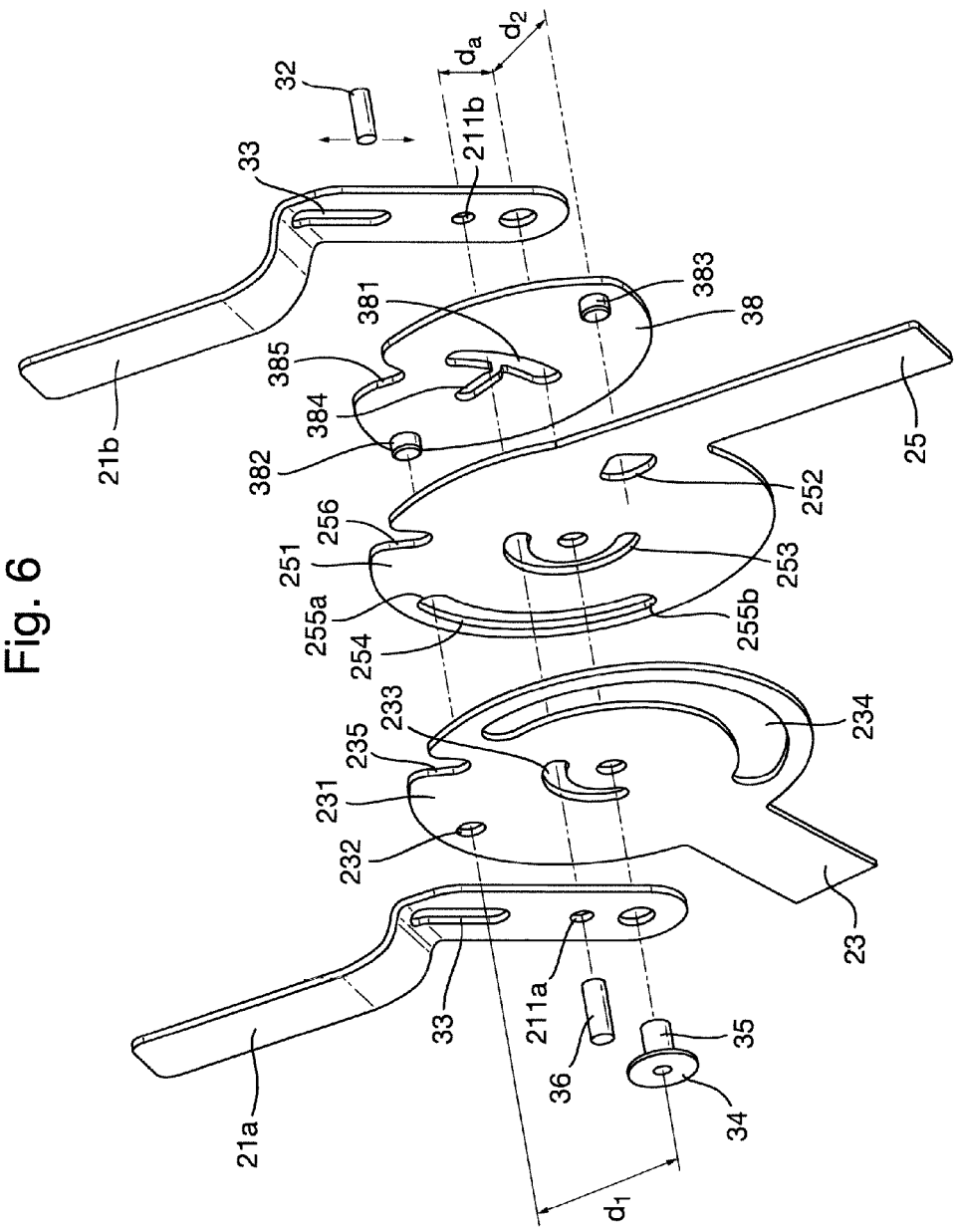
FIG. 6 is an exploded view of the folding mechanism shown in FIG. 5.

Referring additionally to FIG. 6, the third arm 21 is in this illustrated embodiment comprised of a right third arm part 21a and a left third arm part 21b, arranged on opposite sides of the first and second disks 231, 251. The end flange 34 and a similar end flange (not shown) arranged on the other end of the axle, bear against each of the third arm parts 21a and 21b in order to keep the folding assembly components together, as shown in FIG. 5.

A plate member 38, hereinafter referred to as a differential plate 38, is in the illustrated embodiment arranged between the right third arm part 21b and the second disk 251, and comprises an axle slot 381 that is configured such that the common axle 34 may move back and forth in this slot.

The differential plate 38 comprises a first leverage pin 382 that is configured for rotational support by a first receptacle 232 in the first disk 231. The distance between the first receptacle 232 and the common axle 35 is denoted $d_1$.

The differential plate 38 furthermore comprises a second leverage pin 383 that is configured for rotational support by a second receptacle 252 in the second disk 251. The distance between the second receptacle 252 and the common axle 35 is denoted $d_2$.

A bolt 36 extends through a first aperture 211a in the right third arm part 21a, a first arcuate slot 233 in the first disk 231, a second arcuate slot 253 in the second disk 251, a differential slot 384 in the differential element 38, and a second aperture 211b in the left third arm part 21b. In use, the bolt 36 is locked against axial movement by known means (not shown). The bolt 36 and the differential slot 384 are dimensioned such that rotational movement (about the central axle 35) of one or both of the third arm parts 21a,b (generally operated as a unitary third arm 21) is transferred to the differential plate 38, and vice versa. This movement is transferred by abutting interaction between the bolt 36 and one of the sides of the differential slot 384; yet sufficient play is provided such that the bolt may move freely back and forth in the differential slot. The first arcuate slot 233 and the second arcuate slot 253 are configured and dimensioned so as to allow a correspondingly arcuate, reciprocal, movement of the bolt in the respective slots.

The bolt 36 is arranged parallel with the common axle 35, spaced apart by a an axle distance $d_a$.

It will be appreciated by studying FIG. 6 (as well as FIGS. 7a-9b) that the differential plate 38 in a mode of operation is rotationally supported via the first leverage pin 382 in the first receptacle 232. When a force is imposed on the differential plate 38 via interaction between the bolt 36 and the differential slot 384 (the bolt 36 being actuated by the third arm 21), the differential plate 38 rotates on the first leverage pin 382, and the second leverage pin 383 abuts against a side of the second receptacle 252, thus moving the second disk 251.

The first disk 231 comprises a first arcuate cut-out 234, configured and dimensioned so as to allow a correspondingly arcuate, reciprocal, movement of the second leverage pin 383 in the cut-out.

The second disk 251 comprises a second arcuate cut-out 254, configured and dimensioned so as to allow a correspondingly arcuate, reciprocal, movement of the first leverage pin 382 in the cut-out. The length of this second cut-out defines the extent of permitted radial travel for the first leverage pin, limited by the end stops 255a,b.

As mentioned above, the individual components of the folding mechanism may be locked against mutual rotation about the common axle 35 by the operation of the actuator element 39 comprising an arrester peg 32 (described above with reference to FIG. 4b). As indcted in FIG. 6, this locking action is achieved by moving the arrester peg in the peg slot 33 in the third arm parts 21a,b, down into a first notch 235 in the first disk 231, a second notch 256 in the second disk 251, and a differential notch 385 in the differential plate 38, when these three notches are aligned. This position corresponds to the stroller being in the unfolded, operative, state, and is also illustrated in FIGS. 7a and 7b (arrester peg not shown).

The functional relationship between various parts of the folding mechanism will now be discussed with reference to FIGS. 7a to 9b. FIGS. 7a and 7b show opposite sides of the folding mechanism in a state corresponding to an unfolded (or open) state of the stroller. FIGS. 8a and 8b show opposite sides of the folding mechanism in a state corresponding to an intermediate state of folding for the stroller. FIGS. 9a and 9b show opposite sides of the folding mechanism in a state corresponding to a folded state of the stroller.

FIG. 7a shows how the angle between the first arm 23 and the second arm 25 is smaller than the angle between the first arm 23 and the handle bar third arm 21, the difference being the angle denoted a. Therefore, in order to move the folding mechanism (and fold the stroller) to the folded position illustrated by FIG. 9a,b, the handle bar third arm 21 has to travel a greater distance than does the second arm 25 (with respect to the first arm 23) in order to fold onto the first arm 23 in parallel positions. This difference in travelled distance is accommodated by appropriate positioning of the first and second leverage pins 382, 383 with respect to the central axle 35. In the illustrated embodiment, the first and second leverage pins 382, 383, and the bolt 36 lie on an imaginary line L (see FIGS. 7b and 9b). This line L is consequently coincident with the longitudinal axis A of the differential slot 384 (see FIG. 9b).

When the folding mechanism is in the unfolded state (FIG. 7a) the second leverage pin 383 is in a radially outward position in the second receptacle 252 of the second disk is 251. When the folding mechanism is in an intermediate folding state (FIG. 8a), the second leverage pin 383 is in a radially more inward position in the second receptacle 252. This radial travel is denoted by the letter R in FIG. 8a.

When the folding mechanism is in the folded state (FIG. 9a), the arms 21, 23, 25 are parallel in this state. The second receptacle 252 provides, in this embodiment, for a tangential movement of the second leverage pin 383, thus providing a play P in the folding mechanism. The tangential play P allows the folding mechanism—when in a folded state as shown in FIG. 9a,b—to let the second arm 25 rotate to a limited extent towards the unfolded position without affecting rotation of the first 23 or third 21 arms. This limited movement provides a "slack", allowing to easily move the second arm outward in order for a user to get at good hold or grip on said arm (or associated parts) before engaging the folding mechanism and/or to allow for more space for associated wheels in the folded position of the trolley. The rounded "diagonal" edge of the second receptacle 252 connecting to the outer edges limiting the tagential and radial movements allow for direct unfolding of the mechanism from a folded position wherein the slack has been used by slightly unfolding the second arm only.

FIGS. 10a-f illustrate a folding sequence for the stroller. In FIG. 10a, the seat portion 14b is swung upwards and towards the back rest 14a, thereby providing easy access to the release handle 30 on the tubular housing 12. The user operates the release handle 30 in order to release knob 40 from the seat bracket 16 (FIGS. 4b-d), allowing the seat to rotate as shown in FIG. 10b. The user then grips the tubular housing 12 and lifts the stroller (figure d), whereby the folding mechanism is activated by the weight of the front and rear wheel assemblies and corresponding struts 22, 24 and the stroller folds to the position shown in FIG. 10f.

The folding mechanism has been described above with the first arm being configured for connection to the rear wheel assembly, the second arm being configured for connection to the front wheel assembly, and the third arm being configured for connection to a handle bar. The invention shall, however, not be limited to this configuration. Also, the side-by-side arrangement of the disks may be arranged differently than what is described above.

The invention claimed is:

1. A stroller comprising:
a first wheel assembly;
a second wheel assembly;
a handle bar assembly, each respective assembly being configured to connect to respective first, second, and third rotatable elements of a folding mechanism, each of the first, second, and third rotatable elements being rotatably supported by a common axle;
a leverage element rotatably supported by a leverage axle, the leverage axle being supported by the third rotatable element and being arranged in a parallel relationship with the common axle;
wherein the leverage element further comprises an axle slot for accommodating movement of the common axle; and
wherein the leverage element further comprises a first pin and a second pin, the first pin being rotatably supported by the first rotatable element in a receptacle arranged at a first distance from the common axle, the second pin being rotatably supported by the second rotatable element in a second receptacle at a second distance from the common axle.

2. The stroller of claim 1, wherein the common axle and the leverage axle are spaced apart by an axle distance.

3. The stroller of claim 1, wherein the rotatable elements are arranged in a side-by-side relationship.

4. The stroller of claim 1, wherein the first rotatable element further comprises a first arcuate slot;
wherein the second rotatable element further comprises a second arcuate slot; and
wherein the first and second arcuate slots are configured to accommodate an arcuate movement of the leverage axle with respect to the first and second rotatable elements.

5. The stroller of claim 1, wherein the leverage element is rotatably supported by the leverage axle via a leverage slot having sides configured to transfer forces between the leverage axle and the leverage element.

6. The stroller of claim 1, wherein the second rotatable element further comprises a second arcuate cut-out, the second arcuate cut-out being configured to allow movement of the first pin; and
wherein the second arcuate cut-out further comprises end stops configured to limit movement of the first pin within the second arcuate cut-out.

7. The stroller of claim 1, wherein the first, second, and third rotatable elements are connected to respective connection members via respective arms.

8. The stroller of claim 1, wherein the third rotatable element further comprises two halves arranged on laterally opposite sides of an assembly of the first rotatable element, the second rotatable element, and the leverage element.

9. The stroller of claim 1 further comprising a first locking member configured to lock and unlock the folding mechanism against rotation about the common axle;
wherein the third rotatable element further comprises a first locking member slot configured to permit movement of the first locking member;
wherein the first and second rotatable elements further comprise respective first and second locking notches, and the leverage element further comprises a third locking notch; and
wherein each of the respective locking notches are configured to permit locking and releasable engagement with the first locking member.

10. The stroller of claim 9 further comprising two folding mechanisms coupled to two respective lateral sides of the stroller; and
wherein the first locking member of each respective folding mechanism is supported by an actuator element being slidably received in a folding mechanism housing.

11. The stroller of claim 10 further comprising a release means configured to allow simultaneous operation of both of the respective actuator elements of the two folding mechanisms.

12. The stroller of claim 1 further comprising a housing configured to hold the release means;
the housing being configured to extend between the two respective folding mechanism housings; and
the housing comprising a handle bar configured to allow lifting of the stroller.

13. The stroller of claim 12 further comprising a seat attachment associated with each folding mechanism housing, the seat attachment being rotatably supported by at least a portion of the housing; and
wherein the seat attachment comprises a receptacle for a seat and a recess configured to provide a locking engagement with a second locking member configured to allow selective locking of the seat attachment against rotation about the housing.

14. The stroller of claim 13, wherein the second locking member is fixedly connected to the respective actuator element of the respective folding mechanism.

\* \* \* \* \*